United States Patent [19]

Shaffer

[11] 4,418,853
[45] Dec. 6, 1983

[54] PALLET CARRIER

[75] Inventor: James D. Shaffer, Mechanicsburg, Pa.

[73] Assignee: Goodway Transport, Inc., York, Pa.

[21] Appl. No.: 412,582

[22] Filed: Aug. 30, 1982

[51] Int. Cl.³ .......................... B60R 9/00; B62D 25/20
[52] U.S. Cl. ............................... 224/42.41; 224/42.23; 296/37.1; 296/3; 296/1 S
[58] Field of Search ........ 410/32; 224/42.41, 42.26 R, 224/42.23; 296/3, 37.1, 37.6, 1 S; 108/55.1; 105/359

[56] References Cited

U.S. PATENT DOCUMENTS

| | | | |
|---|---|---|---|
| 764,390 | 7/1904 | Stoller et al. | 105/359 |
| 1,113,845 | 10/1914 | Stevens | 224/42.41 X |
| 1,806,429 | 5/1931 | Travis, Jr. | 296/3 |
| 2,061,673 | 11/1936 | Robinson | 296/3 X |
| 2,607,518 | 8/1952 | Cohen | 224/42.41 |
| 2,710,221 | 6/1955 | Hinners | 296/3 |
| 2,936,918 | 5/1960 | Vais | 224/42.23 X |
| 2,958,450 | 11/1960 | Renouf | 224/42.23 |
| 3,240,408 | 3/1966 | Lapansie | 224/42.41 |
| 3,741,604 | 6/1973 | Heath | 296/1 A |
| 3,797,879 | 3/1974 | Edwards | 296/1 S |
| 3,815,948 | 6/1974 | Alford | 296/1 S |
| 3,989,119 | 11/1976 | Cady | 180/89 |
| 4,049,312 | 9/1977 | Rudbeck | 224/42.41 X |
| 4,092,050 | 5/1978 | Sobeck | 296/3 X |

FOREIGN PATENT DOCUMENTS 570653 12/1957 Italy .......................... 296/3

Primary Examiner—Allan N. Shoap
Assistant Examiner—Robert Petrix
Attorney, Agent, or Firm—Thomas Hooker

[57] ABSTRACT

A pallet carrier supported from the bottom of a tractor trailer forward of the rear tires includes a frame defining a number of pallet bays on each side of the carrier and an aerodynamic wing on the forward end of the carrier. The pallet carrier is used to carry wooden pallets when the trailer is loaded with a slip-sheet or floor loaded shipment.

11 Claims, 10 Drawing Figures

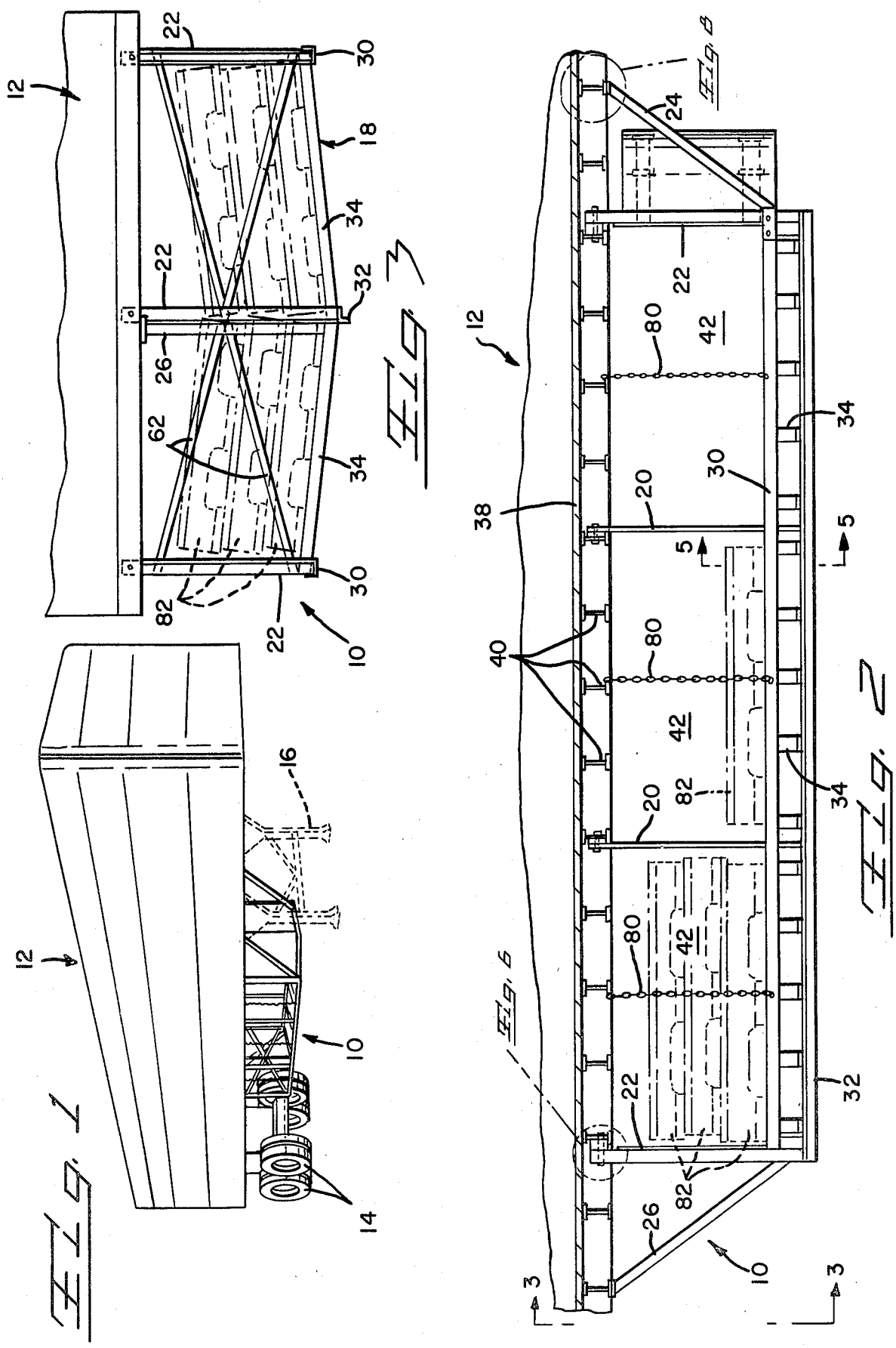

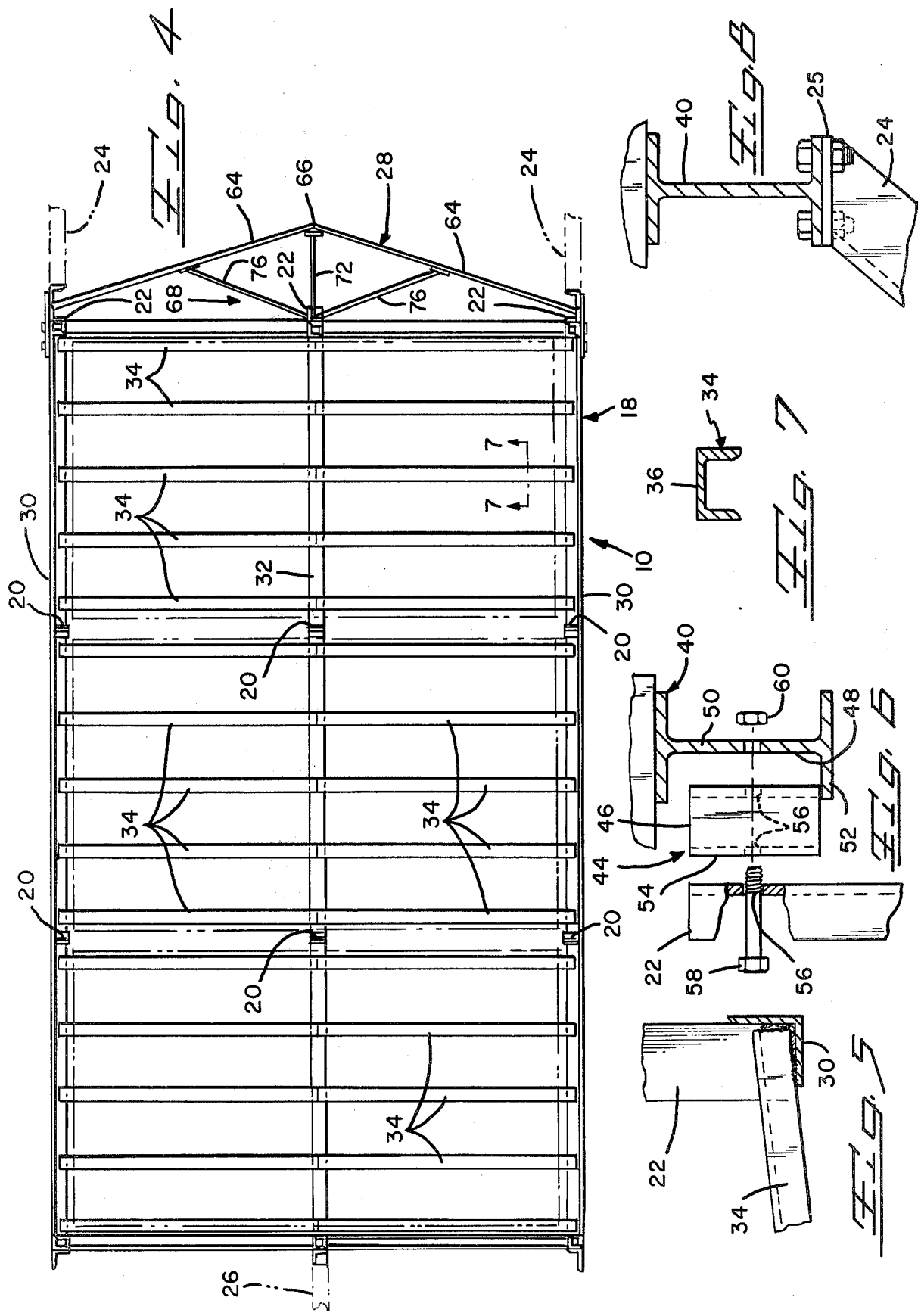

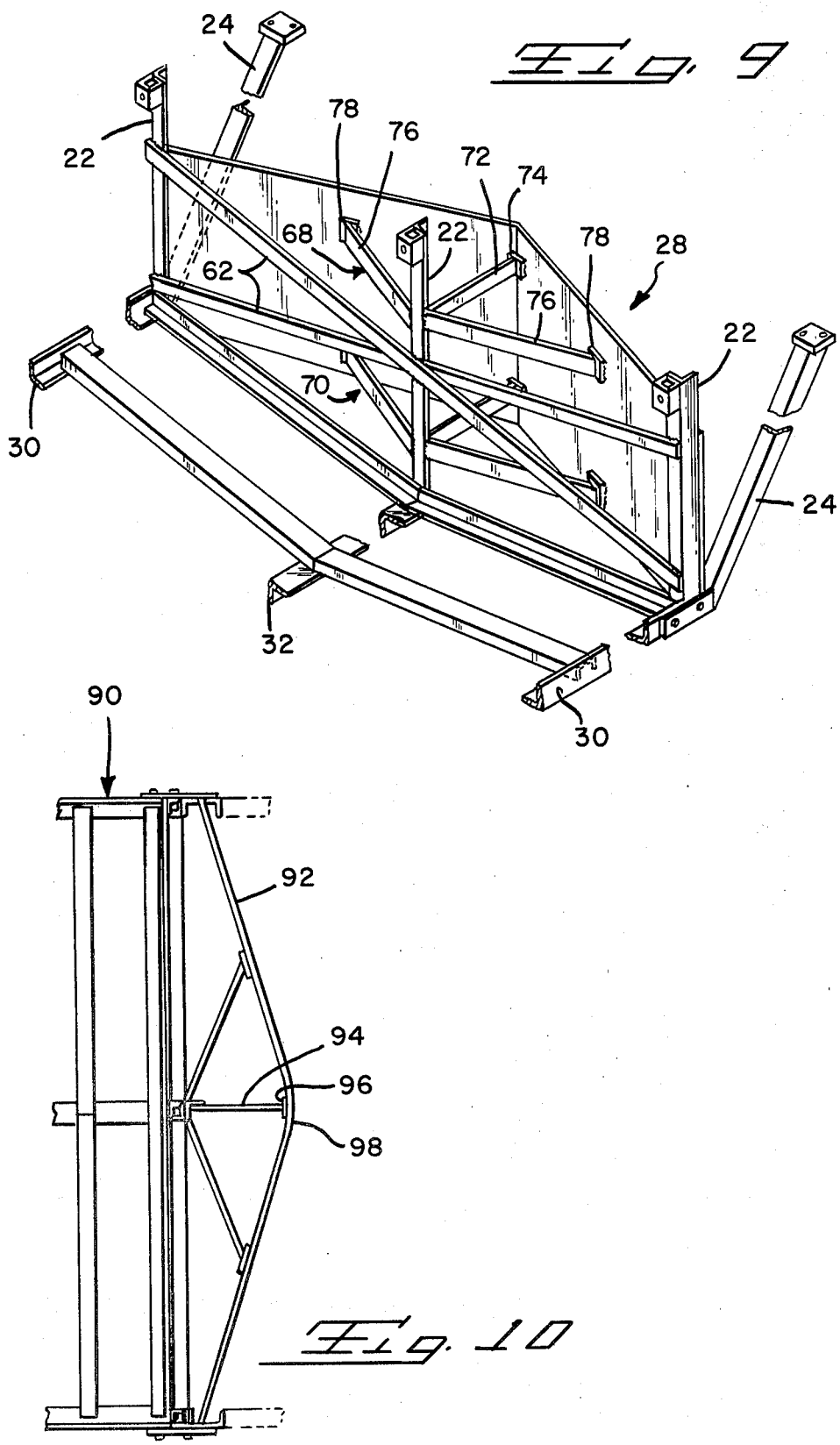

PALLET CARRIER

The invention relates to a pallet carrier attached to the lower surface of a conventional roadway semi-trailer forward of the rear wheels and behind the extendible trailer supports. The pallet trailer includes a lightweight aluminum frame structure having a V-shaped pallet support frame with support bars extending up to the trailer to define a plurality of pallet bays on either side of the carrier. Pallet retention chains are provided for retaining pallets in the bays. An aerodynamic wing is provided on the forward end of the carrier and extends across the width of the trailer to deflect air and roadway debris to either side of the carrier during roadway use. The sides of the pallet support frame are angled downwardly toward the center of the carrier so that the pallets are tipped inwardly at a slight angle to help keep them in place.

Conventionally wooden pallets are used to support cargo loaded in a semi-trailer by forklift trucks. The pallets are reused when a first pallet shipment is unloaded and the trailer is then loaded with a second pallet shipment. However, pallets are discarded following unloading of a pallet shipment and reloading of the trailer with a slip-sheet or floor loaded shipment. Semi-trailers have no capability for carrying pallets outside the cargo area to assure that they are available for use the next time the trailer is to receive a pallet shipment. New pallets must be purchased when the trailer is reloaded with a pallet shipment. The inability to carry pallets while the trailer carries a slip-sheet or floor loaded shipment increases shipping costs because of the required purchase of pallets for pallet cargo. In some cases, pallets are not readily available at a given loading dock and shipments are delayed until pallets can be acquired.

The present invention eliminates these problems by providing a lightweight and aerodynamically efficient pallet carrier which is attached to the lower surface of a semi-trailer between the rear wheels and the forward trailer supports. The carrier defines a number of pallet bays along each side of the trailer to be filled with cargo pallets when the trailer is loaded with cargo which does not require pallets. In this way, the pallets are transported with the trailer and are readily available for use when needed.

The pallet carrier is attached to I-beams extending across the lower surface of the trailer by a specialized connection which enables direct attachment of the support bars to the main beam webs while also permitting varying of the spacing of the bars outwardly of the beams to increase the width of the pallet bays. The support bars between adjacent bays are formed from strip material to maximize usable bay width.

The carrier is preferably formed from lightweight aluminum structural members and typically weighs slightly more than 100 pounds. The aerodynamic wing of the front end is believed to reduce drag and improve fuel efficiency. The wing deflects air to either side of the carrier and at the same time protects pallets in the carrier from roadway water, debris and the like.

U.S. Pat. No. 3,741,604 teaches attaching an open frame assembly to the bottom of a semi-trailer for supporting a lift truck. U.S. Pat. No. 3,240,408 discloses a semi-trailer with specialized compartments in front of the back wheels communicating with the trailer interior. U.S. Pat. No. 2,710,221 teaches cargo-carrying compartments with inwardly sloped bottom surfaces to help retain cargo carried within the compartments.

Welded frames have been attached to the bottom of flat-bed trailers for carrying trailer sideboards when the side-boards are not attached to the sides of the trailer.

Other objects and features of the invention will become apparent as the description proceeds, especially when taken in conjunction with the accompanying drawings illustrating the invention, of which there are three sheets and two embodiments.

IN THE DRAWINGS

FIG. 1 is a perspective view of a semi-truck trailer with a pallet carrier according to the invention attached to the bottom of the trailer in front of the rear wheels;

FIG. 2 is a side view of the pallet carrier in FIG. 1;

FIG. 3 is a view taken along line 3—3 of FIG. 2;

FIG. 4 is a top plan view of the pallet carrier partially broken away;

FIG. 5 is a sectional view taken along line 5—5 of FIG. 2;

FIG. 6 is an enlarged exploded view of a portion of FIG. 2;

FIG. 7 is a sectional view taken along line 7—7 of FIG. 4;

FIG. 8 is an enlarged view of a portion of FIG. 2;

FIG. 9 is a perspective view, partially broken away, of the forward portion of the pallet carrier; and FIG. 10 is a top view of the forward portion of a second embodiment pallet carrier using a one-piece wing.

DESCRIPTION OF THE INVENTION

Pallet carrier 10 is bolted to the lower surface of semi-trailer 12 forward of the rear trailer wheels 14 and behind the extendible trailer supports 16. The carrier 10 includes a pallet support frame 18 suspended from the bottom of the trailer by a number of vertical support bars 20 and 22. Angled support bars 24 and 26 extending from the front and back of the support frame to the bottom of the trailer at an angle to provide desired rigidity. A V-shaped aerodynamic wing 28 extends across the front of the pallet carrier to improve the aerodynamics of the trailer and also prevent soiling of pallets carried in the carrier by roadway dirt, rain and the like.

Pallet carrier 10 is preferably formed from lightweight aluminum structural members. As illustrated in FIG. 3, the carrier has a width slightly less than the width of the trailer 12 and hangs from the bottom of the trailer with the frame 18 located a distance sufficiently above the roadway surface so that the carrier does not interfere with normal use of the trailer.

The pallet support frame 18 includes a pair of outer rails 30 extending along the length of the trailer and a lower center rail 32 located midway between the outer rails. Rails 30 and 32 are joined together by a number of pallet support bars 34 preferably welded to the rails 30 and 32. As shown in FIG. 3, the longitudinal rail 32 is below rails 30 such that the support bars 34 angle downwardly from rails 30 to 32 at a slight angle. The downward slope of the support bars aids in retaining pallets in carrier 10.

The rails 30 and 32 may be formed from angle stock having an L-shaped cross section. The pallet support bars 34 may be formed from U-shaped channel stock as shown in FIG. 7 with the side flanges extending downwardly and with the central web 36 forming a flat pallet support surface for receiving pallets slid into the carrier. The bars 34 each extend from a rail 30 to the center rail 32 where the inner end of the half width bar abuts the end of another bar 34 extending inwardly from the rail 30 on the opposite side of the frame 18.

The pallet carrier 10 is easily mounted on the bottom of semi-trailer 12 as shown generally in FIG. 2. The trailer 12 includes a cargo carrying floor 38 supported by a number of transverse I-beams 40 spaced apart at regular intervals along the length of the floor. I-beams 40 extend across the width of the trailer and are exposed on the bottom of the trailer to permit attachment of the carrier bars 20 and 22 as shown more clearly in FIGS. 2 and 6. Vertical end support bars 22 are formed of L-shaped stock. The carrier includes three bars 22 at each end of the pallet support frame 18. The lower ends of bar 22 are welded to the ends of the rails 30 and 32. Bolt connections join the upper ends of the bars to the I-beams 40. FIG. 3 illustrates three support bars 23 at the back of the pallet carrier. FIG. 7 illustrates the three support bars 23 at the front of the carrier.

The vertical bars 20 are preferably formed of flat stock material in contrast to the L-shaped bars 22. The bars 20 are welded at their lower ends to the rails 30 and 32 and extend upwardly therefrom to bolt connections joining them to I-beams 40 on the trailer. The major surfaces of the flat bars 20 face front and back so that the bars occupy a minimum of longitudinal distance along the carrier, thereby maximizing the storage space available for receiving pallets. As shown in FIG. 4, two sets of three bars 20 are provided along the length of the support frame 18 thereby dividing each side of the support frame into three pallet bays 42. See FIG. 2.

The upper ends of the bars 20 and 22 are secured to the I-beams 40 by bolt and spacer connections 44 as illustrated in FIG. 6. This figure illustrates a connection 44 used to secure one of the L-shaped support bars 22 to a beam 40. Each connection 44 includes a spacer 46 which fits within channel 48 on one side of the horizontal beam 40. The spacer rests flush on the web 50 and has a width equal or greater to the height of the lower beam flange 52 so that the vertical bar rests flush on the outer support surface 54 when bolted to the beam.

A bore 56 extends through web 50, spacer 46 and the upper end of the vertical bar 22. Bolt 58 extends through bore 56 and engages the nut 60 such that when the nut and bolt are tightened down the spacer is seated against the web 50 and bar 22 is held flush on surface 54 and does not bind on the flange 52.

As illustrated in FIGS. 2 and 6, the connections 44 attaching the upper ends of bars 22 to beams 40 use spacers 46 having a thickness greater than the depth of channel 48 with the bars 22 on the front end of the pallet carrier extending up past the front side of beam 40 to which they are bolted and the bars 22 on the back end of the pallet carrier extending up past the back side of the beam 40 to which they are bolted. The connections 44 joining the flat support bars 20 to beams 40 use spacers having a width approximately equal to the depth of channel 48 in the beams 40. As shown in FIG. 2, the forward three bars 20 are bolted to the front side of a beam 40 and the rear three bars 20 are bolted to the back side of a beam 40. By using minimum thickness spacers 46 in the connections 44 for bars 20 and thicker spacers 46 for the connections to the trailer at the ends of the carrier, the pallet carrier has a length greater than the spacing between the beams supporting the end bars 22 with approximately equal width bays.

The pallet carrier includes angled bars 24 formed of L-shaped stock and extending from the forward end of rails 30 to the bottom of the trailer 12. The lower ends of bars 24 may be welded or bolted to the rails 30 or 32 as desired. The upper ends of the bars carry a pad 25 and are preferably bolted to the lower flange of a trailer support beam 40 as illustrated in FIG. 8. If there is insufficient space available to extend bar 24 to a beam 40, the upper end of the bar may be bolted to other structure on the lower surface of the trailer, such as the mounting frame for front trailer support 16.

A single angled support bar 26, similar to bar 24, extends from the back end of rail 32 upwardly to the lower surface of the trailer. As shown in FIG. 2, bar 26 may be bolted to the lower flanges of an I-beam 40 in the same way bar 24 is bolted to the I-beam shown in FIG. 8.

A pair of angled braces 62 is provided at each end of the pallet carrier 10. The braces strengthen the carrier frame against lateral flexing. As illustrated in FIG. 3, each brace 62 extends from the lower end of an outer support bar 22 diagonally upwardly past the middle of the center support bar 22 to the upper end of the bar 22 on the opposite side of the carrier. Similar braces 62 are provided at the forward end of the carrier as illustrated best in FIG. 7. The braces 62 are preferably formed from flat metal stock and are secured to the bars 22 by welding.

The V-shaped aerodynamic wing on the forward end of the carrier is preferably formed from vertical deflecting wing sections 64 extending inwardly and forwardly from the sides of the pallet carrier to a central apex 66 at the middle of the carrier. In the embodiment shown in FIGS. 1 through 7, the wing 28 is formed from two sheets of aluminum plate which are welded to the outer bars 22 and to each other at the apex 66. The plates are supported by upper and lower sets of struts 68 and 70 extending from the middle front support bar 22 outwardly to the plates. Each set of struts include a central strut 72 extending forwardly from bar 22 to a reinforcing pad 74 welded to the inner surface of the wing at apex 66. Side reinforcing struts 76 extend from the central bar 22 to reinforcing pads 78 on the inner surfaces of the flat wing sections 64. The lower strut set 70 includes central and lateral struts like struts 72 and 78 attached to the inner surface of the wing at pads below pads 74 and 78. The two sets of struts support and stiffen the wing 28 on the front of the carrier.

The openings to pallet bays 42 on each side of the pallet carrier are closed by pallet-restraining chains 80 attached to the lower flange of central I-beams 40. The lower end of each chain 80 carries a clip engageable with a hole through the lower outer rail 30. The clip is removed from the rail to open the pallet bay and permit stacking of pallets 82 in the bay as illustrated in FIGS. 2 and 3. The inwardly sloping lower surfaces of frame 18 tip the pallets inwardly within the carrier thereby aiding in retaining them in place during shipment. The pallets are conventionally formed of wood and may be manually loaded into the bays. The pallets slide freely into the bays along the support surfaces 36 of bars 34. After three bays are loaded, the chains 20 are clipped to rails 30 to retain the pallets in place during shipment. The braces 62 prevent forward or rear shifting of the pallets in the end bays.

FIG. 10 is a top view of the forward end of a carrier 90 similar to carrier 10 but with a one-piece aerodynamic wing 92 in place of the two-piece wing 28 shown in FIG. 7. The central struts 94 are attached to pads 96 on the inner surface of a curved apex 98. In other respects, the pallet carrier 90 is like pallet carrier 10.

In highway use, the wing 28 deflects air to either side of the pallet carrier 10 and away from the exposed I-beams 40 extending across the lower surface of the trailer 12. The outwardly deflected air is believed to increase the aerodynamic efficiency of the trailer by preventing eddying of air underneath the trailer within the spaces between the exposed I-beams 40. The efficiency reduces fuel costs. The wing 28 protects the carrier and its contents from roadway water, stone chips, debris and the like which tend to be thrown toward the carrier by the driving wheels of the tractor pulling the trailer.

The invention is not limited to the cargo transported in carrier 10. While the carrier is primarily intended for use carrying pallets, it is useful in carrying other cargo. For instance, the carrier may be attached to a flat-bed trailer and used to carry sideboards for the trailer.

The carrier 10 helps prevent serious roadway accidents which occur when vehicles are accidentally driven under the trailer in the path of the rear wheels. The sides of the rigid carrier 10 shield the space below the trailer and forward of the rear wheels against accidental injury and tend to deflect away vehicles driven obliquely against the trailer forward of the rear wheels. In this way, serious accidents are reduced.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. An open frame carrier adapted to be suspended from the bottom of a semi-trailer forward of the rear wheels for transporting pallets or the like, the carrier comprising a support frame having a width approximating the width of the trailer and a plurality of support bars secured to and extending upwardly from the support frame, the bars being arranged in transverse rows across the width of the support frame and each including connection means on the upper end for attaching the bar to the bottom of the trailer, the rows of bars being spaced along the front-to-back length of the support frame to define a plurality of bays opening on both sides of the carrier, the support frame including longitudinally extended outer rails, a center rail located below the outer rails and a plurality of transversely extending support bars joining the outer rails and center rail so that the support bars angle downwardly from the outer rails to the center rail to aid in retaining pallets or the like in the bays, each bay including at least two spaced support bars for supporting a plurality of pallets or the like loaded in the bay, means for selectively opening or closing the bays on the lateral sides of the carrier to permit either loading, unloading or retention of pallets or the like into or from the bays, and a first stiffening member secured at a lower end to the support frame and angling upwardly to an upper end adapted to be secured to the bottom of the trailer to stiffen the carrier against front and back movement and a second stiffening member secured at a lower end to the support frame and angling upwardly therefrom across the width of the carrier to an upper end permanently secured to stiffen the carrier against lateral movement.

2. A carrier as in claim 1 wherein the lower ends of the support bars are attached to the outer and center rails, and lateral rows of support bars are provided at the forward and rear ends of the rails.

3. A carrier as in claim 2 wherein the rows of support bars between adjacent bays are formed of strip stock, the major faces of the strip stock facing forwardly and rearwardly to maximize bay width.

4. A pallet carrier as in claim 1 including an aerodynamic wing at the forward end of the carrier extending across the width and height of the carrier, the wing including a pair of vertical deflecting wing sections each extending inwardly and forwardly from one forward side of the carrier and joining a central vertical apex.

5. A carrier as in claim 4 including a set of struts joining each wing section and the apex of the wing to a support bar.

6. A carrier as in claim 5 wherein the central apex is rounded and the wing is formed from a single metal sheet.

7. An open frame carrier adapted to be suspended from the bottom of a semi-trailer forward of the rear wheels for transporting pallets or the like, the trailer including at least one exposed I-beam extending across the width of the bottom thereof, the carrier comprising a support frame having a width approximating the width of the trailer and a plurality of support bars secured to and extending upwardly from the support frame, the bars being arranged in transverse rows across the width of the support frame and each including connection means on the upper end for attaching the bar to the bottom of the trailer, the rows of bars being spaced along the front-to-back length of the support frame to define a plurality of bays opening on the sides of the carrier, longitudinally extending outer rails, a center rail located below the outer rails and a plurality of transversely extending support bars joining the outer rails and center rails so that the support bars angle downwardly from the outer rail to the center rail to aid in retaining the pallets or the like in the bays, each bay including at least two spaced apart support bars for supporting a plurality of pallets or the like loaded in the bay, means for selectively opening or closing the bays on the sides of the carrier to permit loading, unloading or retention of the pallets or the like into or from the bays, the connection means on the upper ends of at least one row of bars including a bore extending through the upper end of each support bar, a spacer for each bar having a thickness equal to or greater than the depth of the channel on one side of the I-beam and fitted within such channel so that an outer support surface thereon is flush with or outwardly of the lower I-beam flange, the bore extending through the spacer and the web of the I-beam, and a nut and bolt with the bolt extending through the bore threaded to the nut thereby securing the bars to the beam.

8. A carrier as in claim 7 wherein the trailer includes at least two exposed I-beams extending across the bottom thereof and two rows of bars secured to the I-beams by connections like said connection means, the spacers of the connection means of one row of bars being thicker than the spacers of the connections means for the other row of bars.

9. A carrier as in claim 7 including rows of support bars at the front and back of the support frame, the trailer includes beams adjacent each rows of bars and the bars of said rows, are attached to the beams by connections like said connection means with the beams on the inside of the bars.

10. A carrier as in claim 7 including four rows of support bars, the trailer including a beam for each row of bars, connections like said connection means attaching the bars to said beams with the beams on the inside of the bars of each row and the spacers for the end rows of bars being thicker than the spacers for the interior rows of bars.

11. A carrier as in claim 10 including stiffening means for resisting fore and aft movement of the carrier and stiffening means for resisting lateral movement of the carrier, each of such means including an upwardly angled structural member.

* * * * *